US008904377B2

(12) United States Patent
Burke et al.

(10) Patent No.: US 8,904,377 B2
(45) Date of Patent: *Dec. 2, 2014

(54) RECONFIGURATION OF COMPUTER SYSTEM TO ALLOW APPLICATION INSTALLATION

(71) Applicant: International Business Machines Corporation, Armonk, NY (US)

(72) Inventors: Michael R. Burke, Rochester, MN (US); Nicholas F. Campion, Rochester, MN (US); Kevin W. Kirkeby, Rochester, MN (US); Joseph H. Peterson, Kasson, MN (US)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/777,348

(22) Filed: Feb. 26, 2013

(65) Prior Publication Data

US 2013/0174142 A1 Jul. 4, 2013

Related U.S. Application Data

(63) Continuation of application No. 13/009,416, filed on Jan. 19, 2011, now Pat. No. 8,782,635.

(51) Int. Cl.
*G06F 9/445* (2006.01)

(52) U.S. Cl.
CPC ... *G06F 8/61* (2013.01); *G06F 8/62* (2013.01)
USPC ............................ 717/174; 717/126; 717/177

(58) Field of Classification Search
None
See application file for complete search history.

(56) References Cited

U.S. PATENT DOCUMENTS

| 5,430,878 | A | 7/1995 | Straub et al. |
| 6,405,362 | B1 | 6/2002 | Shih et al. |
| 6,427,227 | B1 | 7/2002 | Chamberlain |
| 6,434,744 | B1 | 8/2002 | Chamberlain et al. |
| 6,467,052 | B1 | 10/2002 | Kaler et al. |
| 6,467,088 | B1 | 10/2002 | alSafadi et al. |
| 6,550,057 | B1 | 4/2003 | Bowman-Amuah |
| 6,564,369 | B1 | 5/2003 | Hove et al. |
| 6,658,421 | B1 * | 12/2003 | Seshadri ........................ 717/126 |
| 6,684,328 | B2 | 1/2004 | Matsuura |
| 6,701,521 | B1 | 3/2004 | McLlroy et al. |

(Continued)

OTHER PUBLICATIONS

"Proceedings of the Environmental Software Systems Compatibility and Linkage Workshop", Pacific Northwest National Laboratory, 2000 ,<http://www.nrc.gov/reading-rm/doc-collections/nuregs/conference/cp0177/0177.pdf>, pp. 1-172.*

(Continued)

*Primary Examiner* — Thuy Dao
*Assistant Examiner* — Samuel Hayim
(74) *Attorney, Agent, or Firm* — Patterson & Sheridan LLP

(57) ABSTRACT

A method and apparatus for installing an application on a computer are disclosed. Following receipt of a request to install an application, a software state, comprising the new application and several of the applications installed on the computer, is derived. Then, the method determines whether the software state can be implemented on the computer. If the software state cannot be implemented on the computer, then the method derives another software state. This is repeated until the derived software state can be implemented on the computer system, or until determining that no software state exists which can be implemented on the computer system.

8 Claims, 9 Drawing Sheets

(56) References Cited

U.S. PATENT DOCUMENTS

| | | | |
|---|---|---|---|
| 7,174,542 B2* | 2/2007 | Wang et al. | 717/126 |
| 7,389,495 B2* | 6/2008 | Wang et al. | 717/126 |
| 7,480,907 B1* | 1/2009 | Marolia et al. | 717/174 |
| 7,730,482 B2* | 6/2010 | Illowsky et al. | 717/177 |
| 7,747,980 B2* | 6/2010 | Illowsky et al. | 717/177 |
| 8,732,669 B2* | 5/2014 | Valdiviezo Basauri et al. | 717/174 |
| 2002/0023529 A1 | 2/2002 | Kurakake et al. | |
| 2002/0129338 A1 | 9/2002 | MacDonell | |
| 2002/0157089 A1 | 10/2002 | Patel et al. | |
| 2008/0127174 A1* | 5/2008 | Johnson | 717/174 |
| 2009/0276771 A1* | 11/2009 | Nickolov et al. | 717/177 |
| 2009/0299698 A1 | 12/2009 | Burke et al. | |
| 2012/0123898 A1 | 5/2012 | Kirkeby et al. | |

OTHER PUBLICATIONS

Giancarlo Succi et al., "Understanding the Dynamics of Software Compatibility", IEEE, 2000, <http://ieeexplore.ieee.org/stamp/stamp.jsp?tp=&arnumber=839376>, pp. 1-3.*

Thomas Conte et al., "A Persistent Rescheduled-Page Cache for Low Overhead Object Code Compatibility in VLIW Architectures", IEEE, 1996, <http://delivery.acm.org/10.1145/250000/243850/p4-conte.pdf>, pp. 1-10.*

Yoon, Il-Chul et al., Effective and Scalable Software Compatibility Testing, Proceedings of the 2008 international symposium on Software testing and analysis, 2008, ACM, New York, United States.

Conte, Thomas M., Dynamic Rescheduling: A Technique for Object Code Compatibility in VLIW Architecture, Proceedings of the 28th annual international symposium on Microarchitecture, 1995, IEEE, Piscataway, United States.

Gosden, John A., Software compatibility: What was promised, what we have, what we need, The MITRE Corporation, 1968, Bedford, United States.

U.S. Appl. No. 13/009,416, entitled Reconfiguration of Computer System to Allow Application Installation, filed Jan. 29, 2011.

* cited by examiner

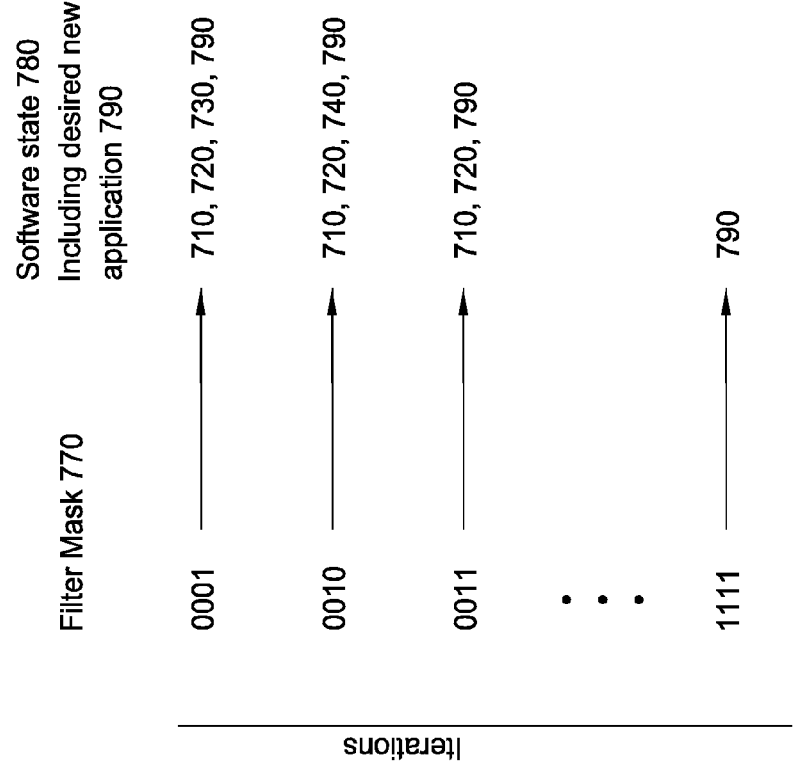

RECONFIGURATION OF COMPUTER SYSTEM TO ALLOW APPLICATION INSTALLATION

CROSS-REFERENCE TO RELATED APPLICATIONS

This application is a continuation of co-pending U.S. patent application Ser. No. 13/009,416, filed Jan. 19, 2011. The aforementioned related patent application is herein incorporated by reference in its entirety.

BACKGROUND

This application relates generally to computers and, more particularly, to tracking the effects of different combinations of software application programs on a computer and selecting an optimal combination of software application programs.

Users have a variety of approaches to use in locating and installing software. For example, a user might visit a website of a software vendor or locate software through a search engine. Alternatively, software applications may be configured to automatically update when a new version becomes available. Also, a user might purchase a CD or flash memory disk used to install software.

Also known are methods of deleting unwanted software. Some undesirable software is automatically deleted by virus scanner programs. Other software could be manually deleted by a user, for example by using "uninstall" mechanisms provided by package management tools.

As users install more and more software, less memory and system resources are available for new software. Also, users tend to forget about software that they installed but fail to use, allowing their computers to become cluttered. An inefficiency may occur when a user finds some new software that she needs, but is unable to install it because not enough resources are available on her system. In this case, the user must either upgrade her machine or delete some of her software. In other cases, a user may install additional software that reduces overall system performance below an acceptable level. In such cases, it may be beneficial to remove some software to improve performance.

SUMMARY

Embodiments of the invention provide a method of managing applications installed on a computer system. The method involves receiving a request to install a first application on the computer system. Then, the method determines whether the computer system can support a first software state, which represents the first application and applications currently installed on the computer system. Upon determining the first software state cannot be supported on the computer system, the method involves successively evaluating one or more second software states, each second software state representing a state that includes at least the first application as having been installed on the computer system and a distinct subset of one or more of the applications as having been uninstalled from the computer system, until identifying a second software states that can be supported on the computer system. The identified second software state may then be suggested to a user Another embodiment includes a system having a processor and a memory storing a program configured to perform an operation for managing applications installed on a computer system. The operation itself may generally include receiving a request to install a first application on the computer system and determining whether the computer system can support a first software state. The first software state represents the first application and applications currently installed on the computer system. Upon determining the first software state cannot be supported on the computer system, one or more second software states are successively evaluated. Each second software state represents a state that includes at least the first application as having been installed on the computer system and a distinct subset of one or more of the applications as having been uninstalled from the computer system, until a second software states that can be supported on the computer system is identified. The identified second software state may then be suggested to a user.

Another embodiment includes a computer-readable storage medium storing machine instructions for managing applications installed on a computer system. The instructions include receiving a request to install a first application on the computer system. In addition, the instructions include determining whether the computer system can support a first software state, wherein the first software state represents the first application and applications currently installed on the computer system. The instructions further require, upon determining the first software state cannot be supported on the computer system following a process. The process involves successively evaluating one or more second software states. Each second software state represents a state that includes at least the first application as having been installed on the computer system and a distinct subset of one or more of the applications as having been uninstalled from the computer system, until identifying a second software state that can be supported on the computer system. Finally, the identified second software may then be suggested state to a user.

Still another embodiment includes a method of managing applications installed on a computer system. The method includes determining whether the computer system can support a first software state, representing the set of applications currently installed on the computer system. Upon determining the first software state cannot be supported on the computer system, the method also includes first evaluating one or more second software states. Each second software state represents a state that includes a distinct subset of the applications as having been uninstalled from the computer system. Second software states are generated until identifying a second software states that can be supported on the computer system. The method also includes suggesting the identified second software state to the user.

BRIEF DESCRIPTION OF THE SEVERAL VIEWS OF DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 7A and 7B illustrates an example of calculating a bitmask placement, a filter mask and a software state, according to an embodiment of the invention.

DETAILED DESCRIPTION

Figure 1:
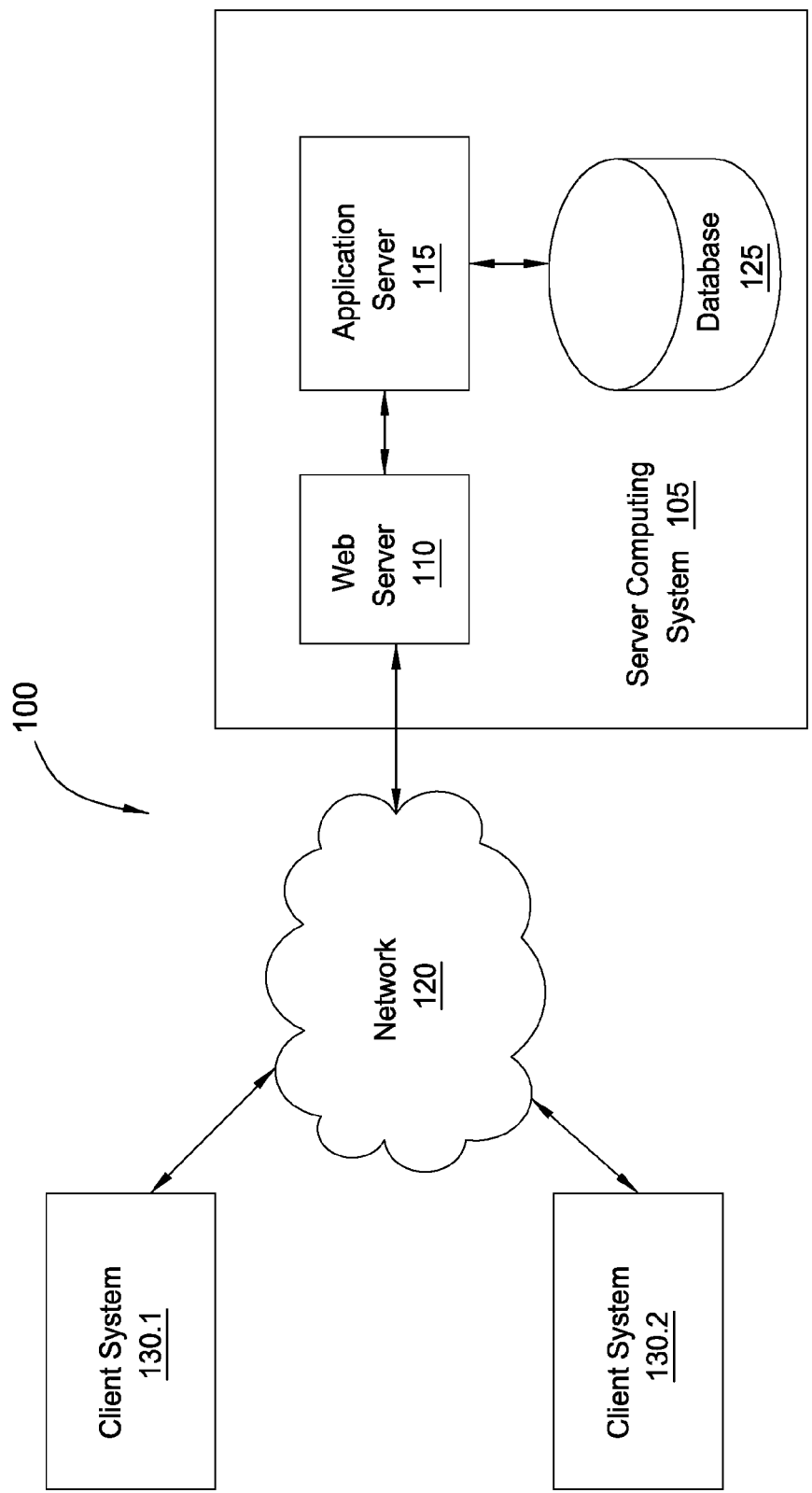
FIG. 1 illustrates a client computing system and a server computing system in communication with one another over a network, according to an embodiment of the invention.

Embodiments of the invention provide methods of installing new software on a client system. Often, there are not enough resources (for example: memory, processor speed, etc.) on a computer system to install the desired new software, and some old software must be deleted to free the necessary resources. According to one embodiment, the user has some control over which software is removed. According to one embodiment, the software that is removed is used infrequently and is not necessary for the proper functioning of the computer system.

In one embodiment, a request to add a new application to a computer system is received. A list of applications installed on the computer system is then obtained. These applications in the list may be sorted according to frequency of use. A frequency of use value is then calculated for each application in the list. A state frequency mask (also referred to as a frequency of use mask or frequency of use value list or table) is then created from the list of applications. The state frequency mask is a representation of a software state with some of the applications removed and some remaining on the computer system. As used herein, "software state," refers to a set of applications installed on a computer.

A filter mask is then created. In one embodiment, the filter mask includes a numerical representation of the state frequency mask. An alternate state mask is then created and compared with the states database to ensure that the proposed state is acceptable. If the state is not optimal, a next software state and corresponding filter mask are generated and the process is repeated. However, if the state is optimal, it is presented to the user, who may accept or reject the state. If the user rejects the state, the processor generates a next software state and corresponding filter mask and the process is repeated. However, if the user accepts the state, the client system is reconfigured by uninstalling the applications that are not installed in the new state and installing the new application. In one embodiment, the states which remove less frequently used applications are presented to the user before those states that remove more frequently used applications.

In another embodiment, instead of presenting to the user one optimal state at a time, the processor presents all of the optimal states to the user, and the user is able to select the one that she prefers. In one embodiment, the states presented to the user are ordered with the states removing the least frequently used applications first appearing closer to the top or beginning of the display.

In the disclosure, reference is made to uninstalling an application to create space to install a new application. However, as one skilled in the art would understand, the techniques described herein could also be used to uninstall an existing application to improve the performance of a computer system, without concurrently installing new applications. For example, the performance of a computer system may need to be improved using these techniques when the computer system is running at close to its maximum capacity.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications data available in the cloud. For example, the local application use data, application catalog, and user history data could execute on a computing system in the cloud and the derivation of the final software state (set of applications installed on a computer), or set of acceptable software states, could also be done in the cloud. In such a case, the software application vendor could analyze available user history data and store the user history and application usage data at a storage location in the cloud. Doing so allows a user to access this information from any computing system attached to a network connected to the cloud (e.g., the Internet). In particular, if a user's former computer is lost or rendered inoperable, and the user acquires a new computer, the user history and application usage data would still be available to the application vendor through the cloud.

FIG. 1 illustrates a computing system 100 on which embodiments may be implemented. As shown, the computing system includes a server computing system 105 and a plurality of client systems 130, including client system 130.1 and client system 130.2. These systems are connected to one another via a network 120. The network 120 may be Internet, an intranet, a wired or wireless local area network (LAN), a cellular network such as GSM or CDMA or other computer network.

Illustratively, the server computing system 105 includes a web server 110, which allows the server computing system to communicate with client systems 130 and other external computers via the network 120. The application server 115 communicates with the web server 105 and presents several available applications to a user accessing the server computer system. The user may select to download the applications on the applications server to her local computer system. The download may be free, may require a payment or may require a user to obtain certain "permissions," i.e., electronic proof that she is an authorized user, such as a student of a certain university or an employee of a certain company. After a user selects an application to download and proves that she is authorized to download it, the process of installing the application described herein begins. The database 125 stores more detailed information about the applications, including executable files configured to install the applications on client computers.

Each client system 130 could be a laptop or desktop computer, a virtual machine, a cluster of computers comprising a or a plurality of virtual machines, a PDA, a network server or any other computing device or set of devices capable of connecting to a network. A user of the client system might occasionally want to install new software on the client system. To do so, the user would access the server that contains this software, such as server system 105, and attempt to download the software from there. Often, there will not be enough resources on the client system to install the new software. In this case, the techniques described herein would be useful to remove rarely-used software and to allow the new software to be installed.

Figure 2:
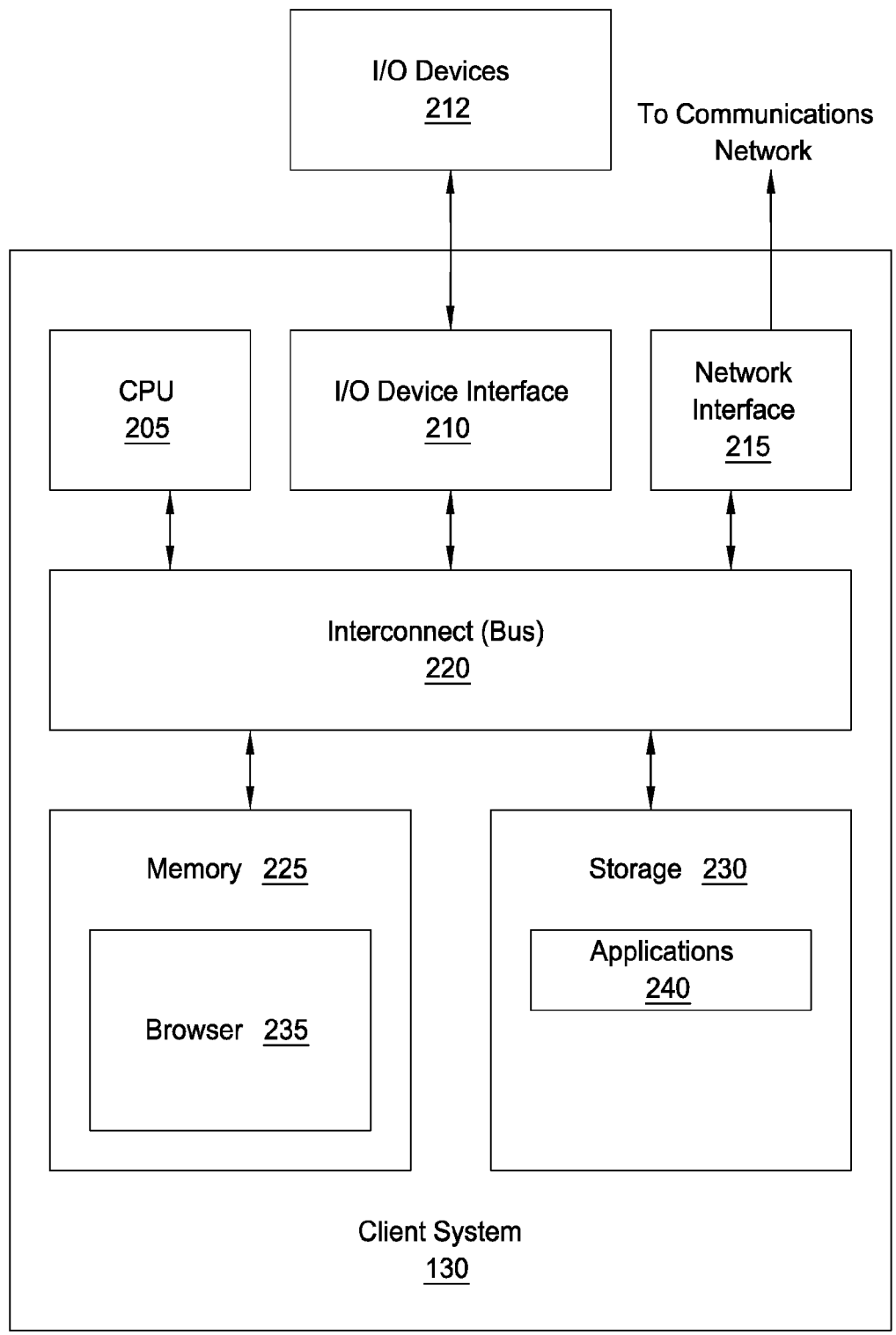
FIG. 2 is a detailed view of the elements of a client computing system, according to an embodiment of the invention.

FIG. 2 illustrates a more detailed view of the client computing system 130 of FIG. 1, according to one embodiment of the invention. As shown, the client computing system 130 includes, without limitation, a central processing unit (CPU) 205, a network interface 215, an interconnect 220, a memory 225, and storage 230. The client computing system 130 may also include an I/O devices interface 210 connecting I/O devices 212 (e.g., keyboard, display and mouse devices) to the client computing system 130.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive, may store non-volatile data.

Illustratively, the memory 225 stores a web browser 235. In one embodiment, the web browser 235 allows a user to access a web page which displays information about a set of applications for the client system 130. The user may select one of the displayed applications to install on the client system 130. Using well-known techniques, the user may cause the web browser to download an executable file. When the user runs the executable file, the new application is installed on the client system.

Storage 230 includes a set of applications 240 installed on the client system 130. In one embodiment, the client system 130 collects information regarding how frequently the various applications 240 are used. For example, an application could be used a certain number of times per week, or for a certain number of hours per week. In another embodiment, the importance of the operation to the computer system, as well as the interoperability of software applications, could also be considered. For example, that a user infrequently accesses a computer drawing program is interpreted differently from a user infrequently accessing a virus scanner program, as the virus scanner is essential for system security. Also, some software may be rarely accessed by the user, but fundamental to ensuring proper system operation. An example of such software is the disk defragmenter. One skilled in the art would be able to readily suggest other metrics of frequency of use.

Figure 3:
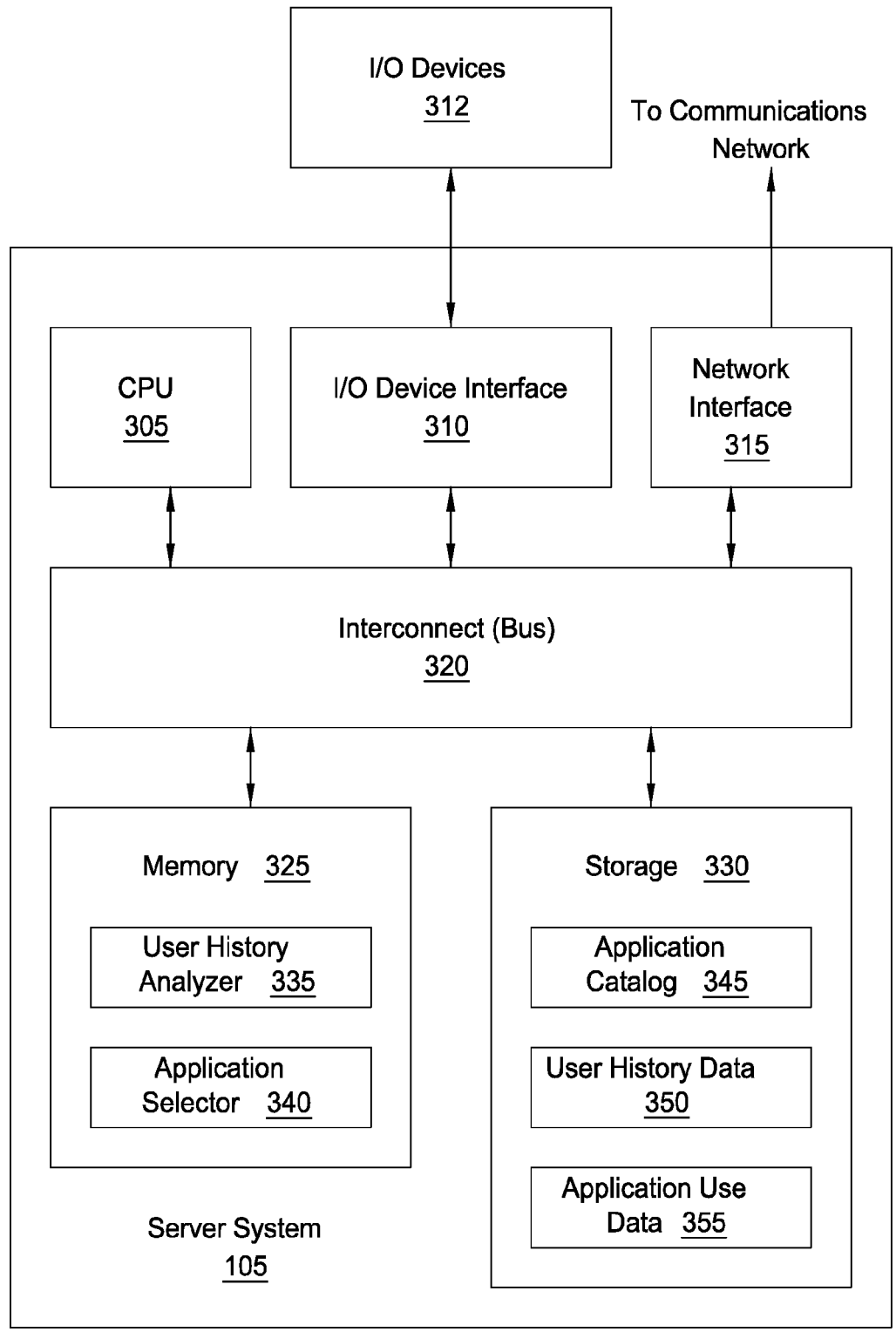
FIG. 3 is a detailed view of the elements of a server computing system, according to an embodiment of the invention.

FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The server system 105 may also include an I/O device interface 310 connecting I/O devices 312 (e.g., keyboard, display and mouse devices) to the server computing system 105.

In one embodiment, the client system 130 accesses the server system 105 to download an application to install on the client system 130. The memory 325 of the server system 105 then presents an application selector 340 to the user. Often, the client system 130 will not have enough free resources to accept the new application. For example, the client system 130 may lack the free random access memory (RAM) or processing speed to execute the application effectively. In this case, it may be possible to delete one or more applications currently stored on the client system 130 to provide space for the new application. A user history analyzer 335, stored in memory 325, may be used to select (or suggest) a least frequently used application (or applications) to delete. The operation of the user history analyzer 335 will be discussed in greater detail in reference to FIGS. 4-6 below.

As shown, the storage 330 includes application catalog 345, user history data 350 and application use data 355. In one embodiment, the application catalog 345 stores descriptions of the applications available to download and/or purchase from the server system. In addition, the storage 330 contains user history data 350. This user history data 350 provides information about the frequency with which a user accesses certain applications on the client system 130. In another embodiment, this information may be stored on the client system 130. In addition, if the user of the client system 130 is migrating from one client system to another, or uses more than one client system 130, then the data about all of the user's present and former computing systems is stored in the user history data 350, according to an embodiment. The application use data 355 stored by the server system 105 is described in greater detail in FIG. 4.

Figure 4:
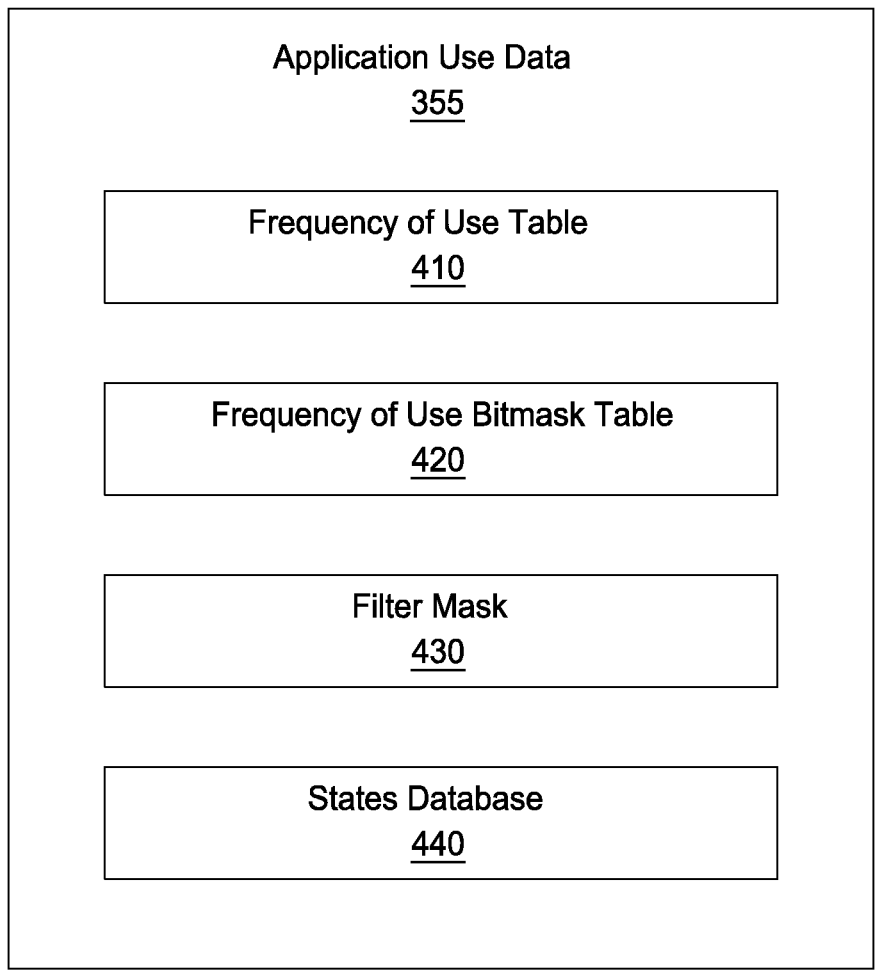
FIG. 4 is a detailed view of the application use data of a client computing system, according to an embodiment of the invention.

FIG. 4 illustrates the data that the server system 105 stores in the application use data 355, according to one embodiment. The frequency of use table 410 maps all of the applications on a client system 130 to how frequently they are used. One skilled in the art will recognize several metrics for frequency of use. For example, frequency of use could be measured in terms of the number of times an application is opened per week, the number of hours for which an application is run per week, the number of files created by the application, etc. The frequency of use bitmask table 420 maps each application to a frequency of use bitmask. The frequency of use bitmask is a binary number representing the application. More frequently used applications have greater frequency of use bitmasks. The computation of the frequency of use bitmask is described in greater detail below and in FIGS. 7A and 7B.

The application use data 355 also contains a filter mask 430. The filter mask is a sum of several bitmask, which represent several applications that might be deleted to provide resources to install a new application. According to one embodiment, the applications that are included in the filter mask could be derived from the filter mask value. The calculation of the filter mask is described in detail below and in FIGS. 7A and 7B.

The states database 440 represents a set of software states. Each valid software state represents a set of applications that is valid—that can be installed in the client system 130 simultaneously. All the applications in each invalid software state cannot be installed in the client system 130 simultaneously. Each software state represents a subset of the applications currently installed on the client system 130, which might remain on the client system 130 following the installation of new software. Various software states and their derivation are described in greater detail below and in FIGS. 7A and 7B. The states database 440 includes information about which software states are valid and which software states are not valid.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5A:
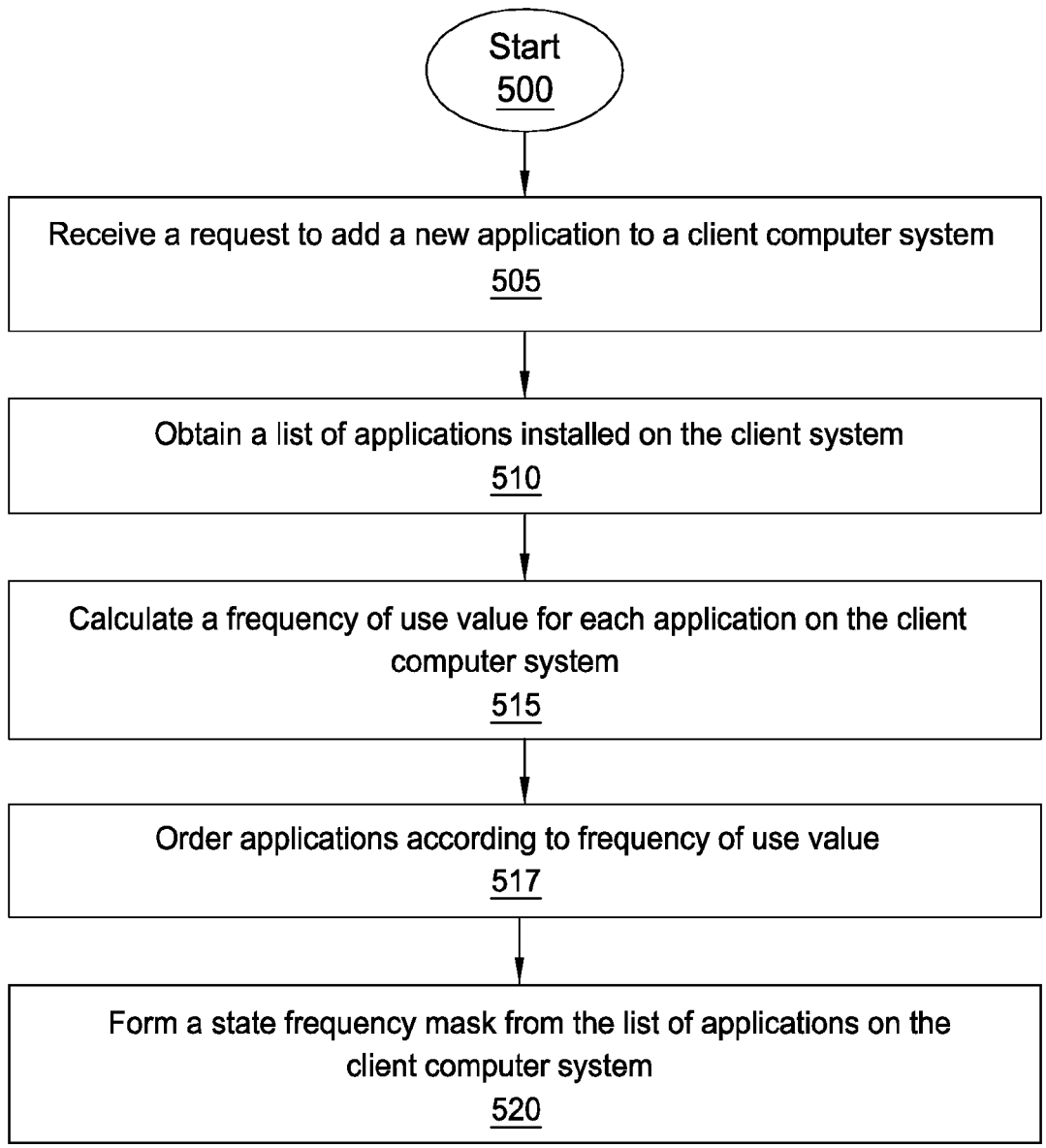
FIGS. 5A and 5B illustrate a method of reconfiguring a client computer system in order to install a software application, according to an embodiment of the invention.

FIG. 5A illustrates a flow chart for a method 500 of reconfiguring a client computer system 130 to allow additional software to be installed, according to an embodiment. The user of the client computer system 130 is presented only one optimal state at a time, which the user must accept or reject. One skilled in the art would realize that the steps on this flow chart could be carried out on the client computer system 130, on the server computer system 105, on a third party's computer system or in the "cloud" on a physical or virtual machine connected to the network.

As shown, method 500 begins at step 505 when the server computer system 105 receives a request from a user to add a new application to a client system or to remove some of the applications 240 from the client system 130 to optimize performance. For example, to install a new application, a user may interact with the browser 235 on client system 130 to retrieve a list of available applications from application catalog 345 on the server system 105. Alternatively, the user could install an application from a CD/DVD ROM or flash memory device. In yet another embodiment, the download could occur when the client system 130 is connected to the Internet through the network interface 215 or when an application from the set of applications 240 is configured to automatically check for updates.

At step 510, the server computer 105 may respond to the request by obtaining a list of applications installed on the client system 130. As described above, this list may be stored either on the client system 130 or on the server system 105. However, if it is stored on the server system 105, it may need to be updated and checked for accuracy periodically.

At step 515, a frequency of use is calculated for each application installed on the client computer system 130. This frequency of use value is stored in the frequency of use table 410. Metrics of frequency of use include amount of time the application is used per week, number of times the application is opened per week, number of files created using the application, and similar. According to one embodiment, the frequency of use for each application, f, is a number between 1 and n, where n is the number of applications on the server. The f values are ordered from least frequently used to most frequently used. In other words, for the least frequently used application, f=1. For the second least frequently used application, f=2. For the most frequently used application, f=n. At step 517, the applications are ordered according to their frequency of use values, calculated in step 515.

At step 520, the frequency of use values is used to form a state frequency mask or bitmask for the list of applications on the client system 130. These bitmasks are stored in the frequency of use bitmask table 420. The state frequency mask describes the frequency of use of the application with the least frequently used application being represented by the least significant bit and the most frequently used application being represented by the highest bit. For example, if there are four applications—Application 1, Application 2, Application 3, and Application 4—arranged in order of frequency of use from least to most frequent, the bitmask associated with each application is as follows:

Application 1 . . . Bitmask=0001 (least frequently used application)
Application 2 . . . Bitmask=0010
Application 3 . . . Bitmask=0100
Application 4 . . . Bitmask=1000 (most frequently used application)
Application f . . . Bitmask=$2^{(f-1)}$ in binary.

Figure 5B:
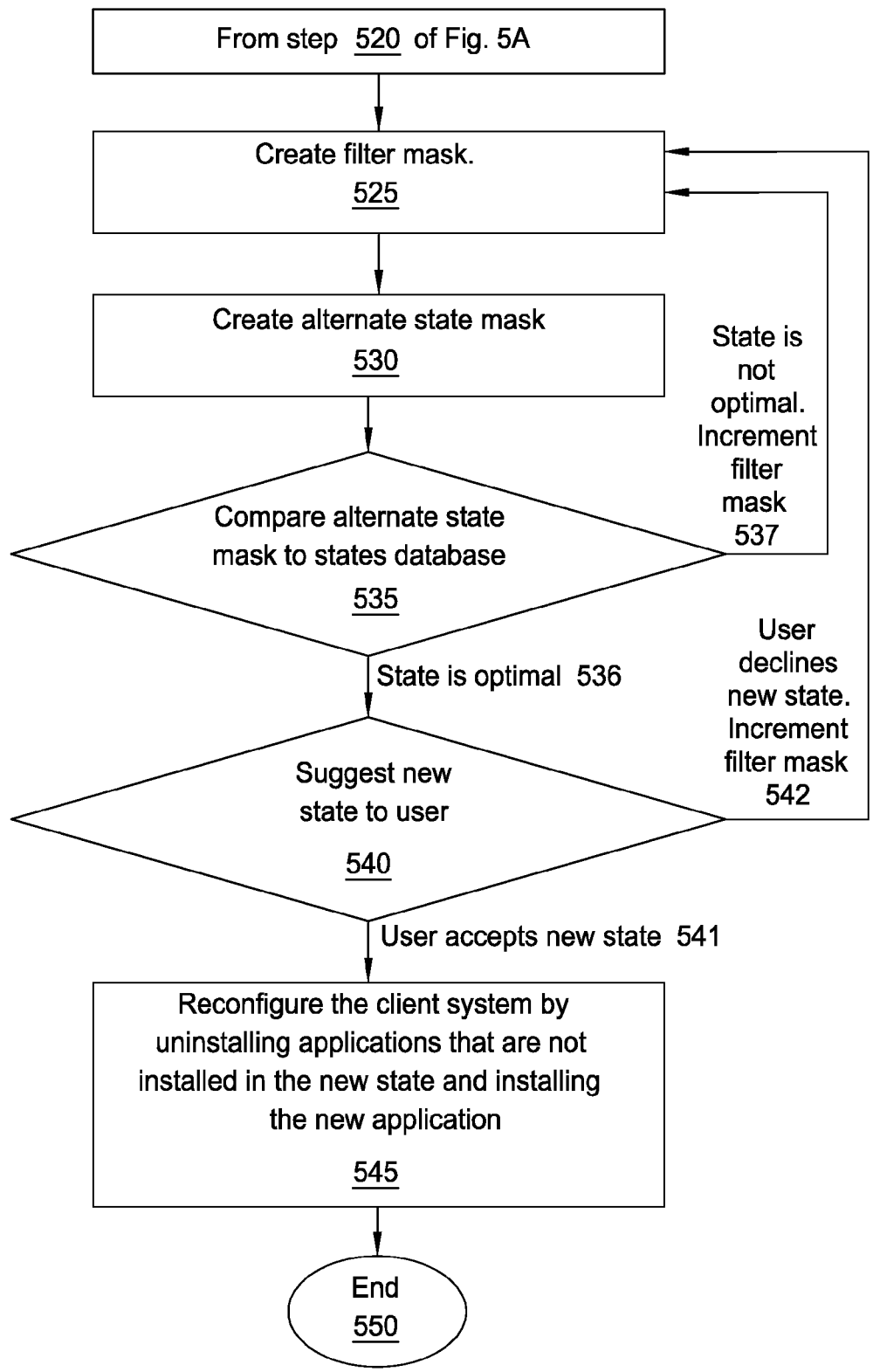

FIG. 5B illustrates the continuation of the flowchart in FIG. 5A, according to an embodiment. At step 525, a filter mask 430 is created. The filter mask 430 represents a set of applications to consider removing from the client system 130. The filter mask is the sum of the bitmasks to the applications that are to be removed. In the above example, removing applications 1 and 2, while keeping applications 3 and 4, would be represented by a filter mask of 0011 (bitmask of application 1+bitmask of application 2).

At step 530 an alternate state mask is created by applying a XOR operation to the filter mask with the state frequency mask that describes the current state. This alternate state mask is compared to a database of states 440 (step 535) to determine whether the client system 130 could run the desired new application with the remaining applications as specified by the alternate state mask.

If the new state is not optimal, to the degree that the client system would be unable to run the new application under the new state (step 537), then the filter mask is incremented, and step 525 is repeated with the new filter mask. One skilled in the art would realize that, in some situations, there may be zero, one, or several different optimal states and representations thereof.

In one embodiment, the various software states are evaluated as the filter mask 430 is incremented. This walk has the effect of first removing only the least frequently used application (filter mask=0001), then only the second least frequently used application (filter mask=0010), then only the two least frequently used applications (filter mask=0011), etc. Of course, those skilled in the art will recognize other approaches for walking through all of the possible filter masks or software states.

At step 536, if the state represented by the current filter mask is optimal, to the degree that the client system would be able to run the new application under the new state, then the new state is suggested to the user of the client system 130 (step 540). If the user declines the new state 542, then the filter mask is incremented and the process of walking through the filter masks or software states returns to step 525 with the next filter mask.

If the user accepts the new state 541, then the client system 130 is reconfigured by uninstalling the applications that are not installed in the new state and installing the new application that the user requested 545. After the new application is successfully installed, the process is finished 550.

In other embodiments, the process described above is slightly modified. For example, in one embodiment, applications that are currently running are not eligible to be removed. In another embodiment, applications that are used with a frequency greater than some threshold are not eligible to be removed.

Figure 6:
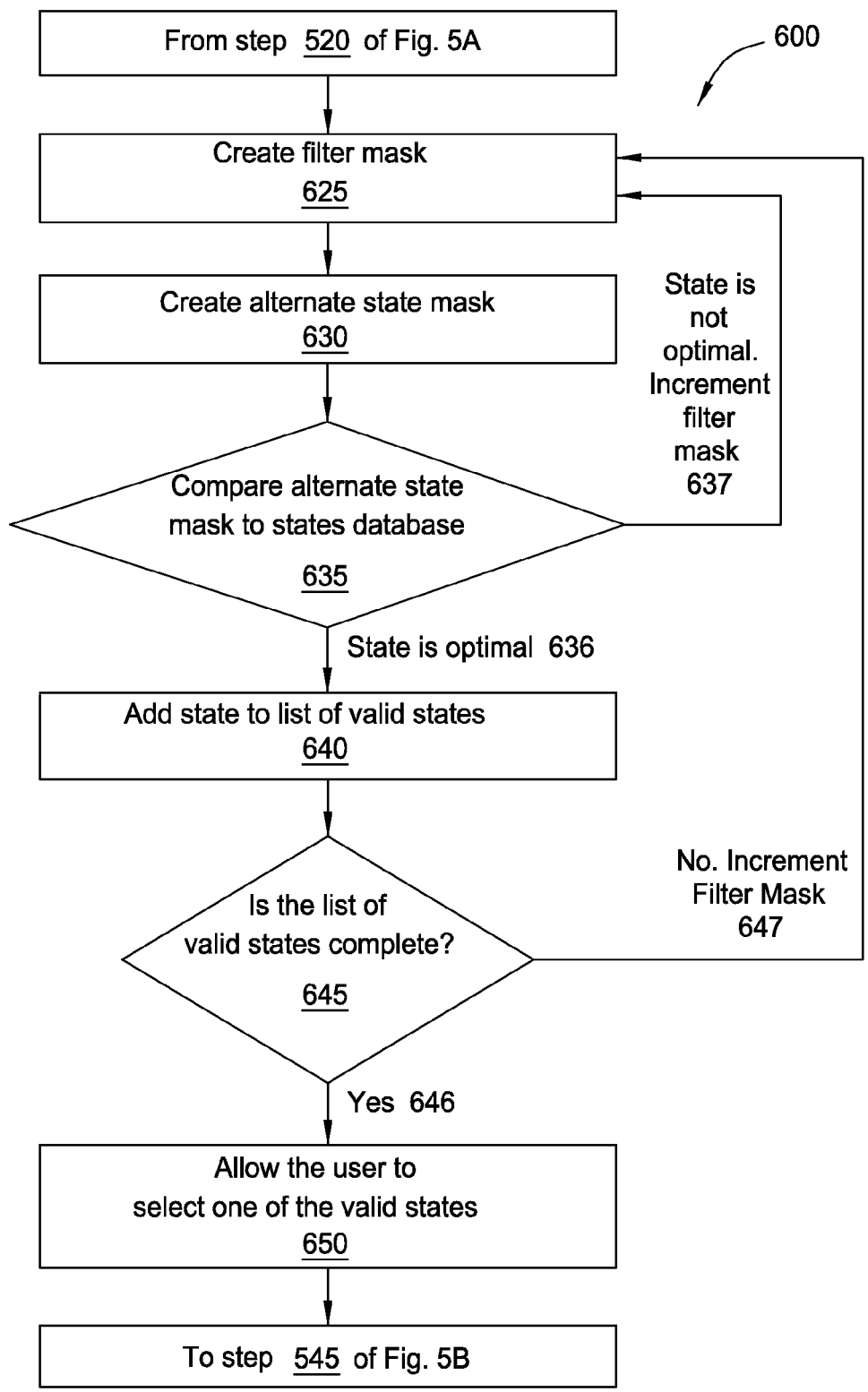
FIG. 6 illustrates a method of reconfiguring a client computer system to install additional software, according to an embodiment of the invention.

FIG. 6 illustrates a flow chart for a method 600 of reconfiguring a client system 130 to allow additional software to be installed. However, unlike the method of FIGS. 5A and 5B, where the user was presented with one optimal state at a time, here the user is presented a selection of a plurality of optimal states. As shown, the method 600 begins after step 520 of FIG. 5A, after the derivation of the state frequency mask for the applications on the client system 130. As in FIG. 5B, the filter mask 430 is created 625, and the alternate state mask is created 630. At step 635, the alternate state mask is compared to the states database 440. If the state is not optimal 637, the filter mask is incremented and the process returns to step 625. However, if the state is optimal 636, then the current state is added to the list of optimal states 640.

Step 645 involves determining whether the list of optimal states is complete. In one embodiment, this may occur by determining whether the process has checked all of the possible states. If the list of optimal states is not complete 647, then the filter mask is incremented and the process is returned to step 625. Otherwise, if the list of optimal states is complete (step 646), then the list is presented to the user, who may select one of the states that includes the software application that the user wishes to install on the client system 130 (step 650). After the user selects a state, the process is returned to step 545 of FIG. 5B, where the client system 130 is reconfigured according to the state selected by the user. The applications that are not installed in the new state are removed, and the new application is installed. An alternative embodiment of the invention may require no user interaction. Under the alternative embodiment, the optimal valid state automatically rather than with user input.

Figure 7A:
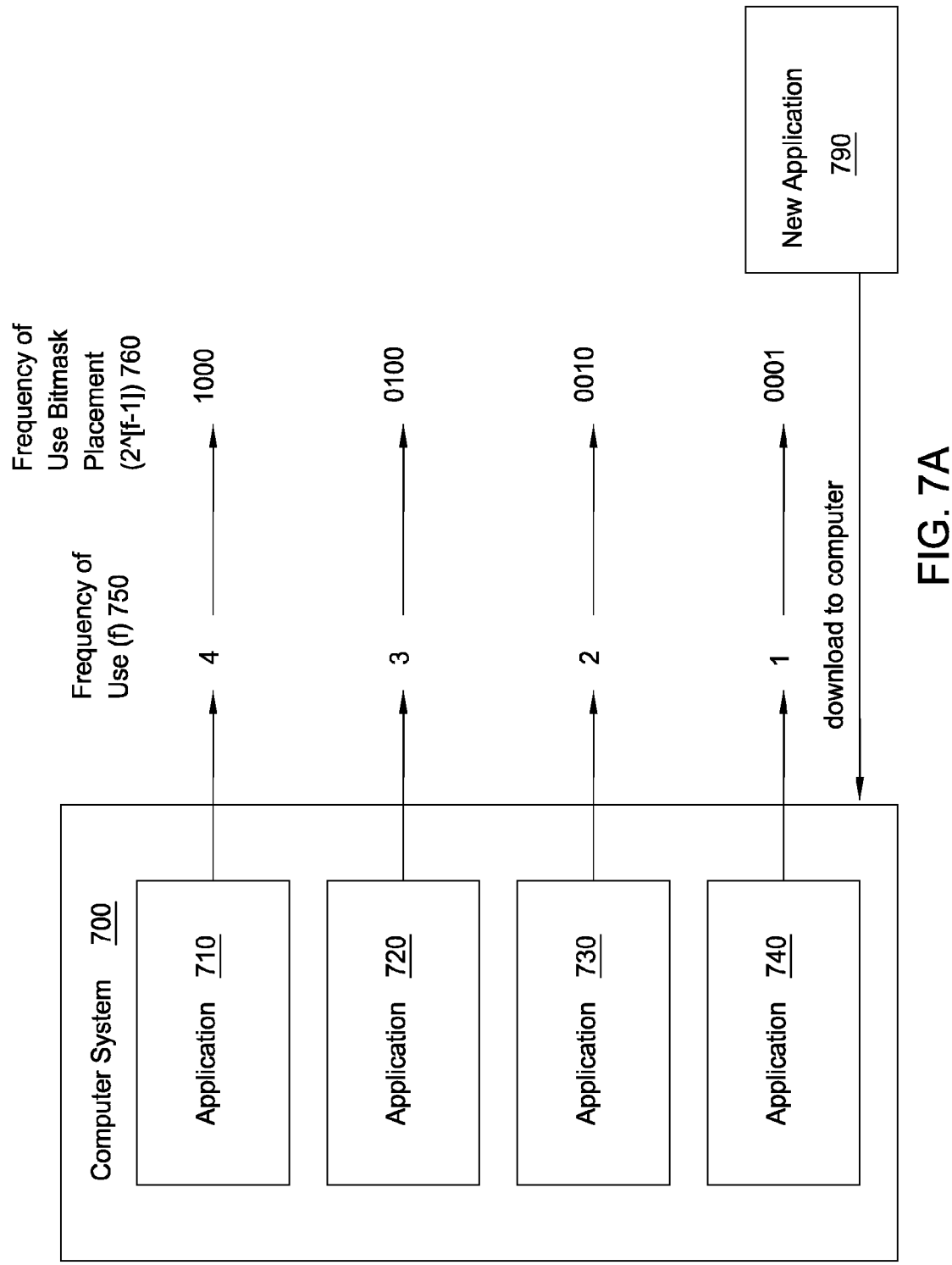

FIG. 7A illustrates the values that need to be calculated in order to install a new software application on a computer system 700, according to one embodiment of the invention. As shown, the computer system 700 includes four applications 710, 720, 730 and 740. In this example, assume a user wishes to download and install application 790 on computer system 700. However, as a result of applications 710, 720, 730 and 740, not enough resources are available on the computer 700 to successfully install application 790. Therefore, the user of computer system 700 may prefer to uninstall at least one of the existing applications 710, 720, 730 and 740 in order to install new application 790.

As shown, a frequency of use value 750 of each of the applications is calculated and the applications are arranged in order of frequency of use. In this example, the least frequently used application, application 740, is assigned f=1. The other applications are assigned the values of 2, 3 and 4, in order of increasing use, respectively. Those skilled in the art would realize that, if there were more than four applications, numbers greater than 4 could be assigned to f.

The frequency of use bitmask 760 for each application is calculated from the frequency of use f. The value of the frequency of use bitmask is binary $2^{(f-1)}$. For example, for the least frequently used application 740, the bitmask is 0001. For the most frequently used application 710, the bitmask is 1000. One skilled in the art would realize that, if there were more than four applications, the bitmask could require more than four bits.

FIG. 7B further illustrates the values that are calculated to install a new software application on computer system 700, according to an embodiment. As shown in FIG. 7B, the filter masks 770 represent a set of applications to consider removing from the client system 130. The filter mask is the sum of the bitmasks to the applications that are to be removed. These filter masks 770 include the desired new application 790. Each of the filter masks 770 can be translated into a software state 780, where the desired new application 790 is always installed, a zero represents an application bitmask to be kept and a one represents an application bitmask to be deleted. For example, filter mask 0011 represents that applications 710 and 720 are present in the software state, applications 730 and 740 are absent and new application 790 is present.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing applications installed on a computer system, comprising:
  receiving a request to install a first application on the computer system;
  determining whether the computer system can support a first software state representing the first application and applications currently installed on the computer system; and
  upon determining the first software state cannot be supported on the computer system:
    generating a representation of one or more second software states by:
      generating a filter mask, wherein the filter mask represents the distinct subset of one or more applications to represent as having been uninstalled from the computer system in a respective one of the second software states; and
      determining a set of applications represented by respective second software state by combining a frequency of use bitmask and the filter mask, and
    successively evaluating, by operation of one or more computer processors, one or more of the second software states, wherein each second software state includes at least the first application as having been installed on the computer system and a distinct subset of one or more of the applications as having been uninstalled from the computer system, until identifying at least a first one of the second software states that can be supported on the computer system.

2. The method of claim 1, further comprising:
  uninstalling the distinct subset of one or more applications represented in the first one of the second software states from the computer system; and
  installing the first application on the computer system.

3. The method of claim 1, further comprising:
  obtaining a list of applications currently installed on the computer system.

4. The method of claim 1, wherein the order of the bits in the frequency of use bitmask corresponds to a frequency of use of the applications on the computer system.

5. The method of claim 4, wherein the frequency of use value is based on at least one of a number of times the application is run, and a time between successive runs of the application.

6. The method of claim 1, wherein each successive second software state is generated by incrementing the filter mask and combining the frequency of use bitmask and the filter mask to generate each successive second software state.

7. The method of claim 1, further comprising, presenting one or more of the identified second software states to a user.

8. A computer-implemented method of managing applications installed on a computer system having a set of applications, comprising:
  determining whether the computer system can support a first software state, wherein the first software state represents the set of applications currently installed on the computer system; and
  upon determining the first software state cannot be supported on the computer system:
    generating a representation of one or more second software states by:
      generating a filter mask, wherein the filter mask represents the distinct subset of one or more applications to represent as having been uninstalled from the computer system in a respective one of the second software states; and
      determining a set of applications represented by respective second software states by combining a frequency of use bitmask and the filter mask,
    successively evaluating one or more of the second software states, wherein each second software state represents a state that includes a distinct subset of one or more of the applications as having been uninstalled from the computer system, until identifying a second software states that can be supported on the computer system, and
suggesting the identified second software states to a user.

\* \* \* \* \*